United States Patent [19]
Aptel et al.

[11] Patent Number: 4,882,223
[45] Date of Patent: Nov. 21, 1989

[54] HOLLOW FIBERS PRODUCTION METHOD THEREOF AND THEIR APPLICATIONS PARTICULARLY IN THE FIELD OF MEMBRANE-TYPE SEPARATIONS

[75] Inventors: Philippe Aptel; Jean-Michel Espenan, both of Toulouse, France

[73] Assignees: Institut National de Recherche Chimique Appliquee (IRCHA); Centre National de la Recherche Scientifique, both of Paris, France

[21] Appl. No.: 115,625

[22] Filed: Oct. 30, 1987

Related U.S. Application Data

[63] Continuation of Ser. No. 841,537, Jan. 30, 1986, abandoned.

[30] Foreign Application Priority Data

Jun. 13, 1984 [FR] France ................................ 84 09224
Jun. 13, 1984 [FR] France ................................ 84 09225

[51] Int. Cl.$^4$ ............................................. D02G 3/00
[52] U.S. Cl. .............................. 428/398; 210/500.22; 210/500.23; 428/376
[58] Field of Search ................... 210/500.22, 500.23; 428/376, 398, 359, 364, 373, 400, 401

[56] References Cited

U.S. PATENT DOCUMENTS

| | | | |
|---|---|---|---|
| 3,871,950 | 3/1975 | Hashino et al. | 210/503 |
| 4,175,153 | 11/1979 | Dobo et al. | 428/398 |
| 4,454,085 | 6/1984 | Schindler et al. | 428/398 |
| 4,481,260 | 11/1984 | Nohmi | 428/398 |

FOREIGN PATENT DOCUMENTS

| | | |
|---|---|---|
| 92587 | 11/1983 | European Pat. Off. . |
| 1307979 | 12/1961 | France . |
| 2265437 | 3/1975 | France . |
| 2396104 | 6/1978 | France . |
| 2435276 | 9/1979 | France . |
| 970400 | 9/1964 | United Kingdom . |
| 1497298 | 1/1978 | United Kingdom . |

OTHER PUBLICATIONS

J.P. Abstract, 54-10282.
Cabasso, I., et al., Journal of Applied Polymer Science, vol. 21, pp. 165-180, (1977).

*Primary Examiner*—Lorraine T. Kendell
*Attorney, Agent, or Firm*—Browdy and Neimark

[57] ABSTRACT

Non symmetrical hollow fibres presenting a relatively dense layer ('skin') (H) of a very small thickness (<1 μm) at their outer periphery, which is bound to a so called 'open' structure of which the porosity increases in the direction to the inner face; said porous structure comprises microvoids (1) shaped like elongate fingers open to the inside. The invention also relates to the method for obtaining such a symmetrical hollow fibres by known spinning techniques by dry-wet process, by adding to the solution for spinning the polymer in the solvent at least one particular additive and by adding a particular fluid through the hole of the extruded product. Finally, the invention aims at applying the hollow fibres in question to various fields and particularly in ultra-filtration or micro-filtration, in dialysis, reverse osmosis, in gas permeation or pervaporation or they may also be used as supports for liquid membranes.

8 Claims, 5 Drawing Sheets

⊢⎯⎯⊣ 50 μm

⊢⎯⎯⊣ 25 μm

⊢⊣ 5 μm

⊢⊣ 1 μm

HOLLOW FIBERS PRODUCTION METHOD THEREOF AND THEIR APPLICATIONS PARTICULARLY IN THE FIELD OF MEMBRANE-TYPE SEPARATIONS

This application is a continuation of application Ser. No. 841,537, filed Jan. 30, 1986.

This invention relates to novel hollow fibres based on fibrogenic polymeric substances.

A certain number of hollow fibres based on fibrogenic polymeric substances with asymmetric structures are already known. Such asymmetric structures generally belong to one of the following classes:

the class of structures presenting a relatively dense layer called hereinafter "skin" on the periphery of the inner channel of the fibre with, as a significant characteristic, an increasing porosity (from the inside of the outside of the fibre) and the presence of macrovoids between such inner skin and the outer periphery of the fibre. Such a fibre is illustrated in FIG. 1 (a cross-sectional view according to a plane perpendicular to the longitudinal centerline of the fibre) of the attached drawings. With reference to such figure there has been schematized in A a portion of the inner skin, in B the macrovoids, the reference C designating the outer periphery of the fibre and the arrow F symbolizing the porosity increasing from the inside to the outside of the fibre. Fibers having such a structure are disclosed for example in U.S.A. Pat. Nos. 3,526,588, 3,615,024, 3,423,491;

the class of structures presenting as in the preceding case an inner skin, a porosity increasing from the inside to the outside of the fibre, but the absence of macrovoids. Thus FIG. 2 of the attached drawings schematizes a fibre of this class, with A designating the inner skin, D the section between such inner skin and the periphery C, wherein there can be noted the absence of macrovoids and the arrow F symbolizing the porosity increasing from the inside to the outside of the fibre. Such fibres are for example disclosed in U.S.A. Pat. No. 4,051,300;

the class of structures presenting an inner skin and an outer skin, both skins lying on either side of a section of the fibres presenting a majority of macrovoids. Such a fibre is illustrated in FIG. 3 of the attached drawings. In this figure there is shown in A the inner skin, in E the outer skin and between both of them macrovoids B. Porosity in this type of fibres also increases but in the direction of both arrows $F_1$ and $F_2$. This type of fibres is for example disclosed in French Pat. No. 77,34031;

the class of structures which opposite to the previously described classes does not have any inner skin but having however only an outer skin. Such fibres do not comprise any macrovoids between the outside and the inside of the fibre. Their porosity increases from the outside of the inside. FIG. 4 illustrates such a fibre. There is schematized therein in E the outer skin and in D the porous layer, porosity in this case increasing in the direction of arrow $F_3$. Such fibres have been disclosed for example in French Pat. No. 80,06858;

the class of structures presenting as in the case of the fibres illustrated in FIG. 3 an inner skin and an outer skin but with the presence of macrovoids between these two skins. Such a fibre is shown in FIG. 5. A and E respectively designate the inner and outer skins with a certain proportion of macrovoids and microvoids (B and D). In this case porosity increases in the direction of both arrows $F_4$ and $F_5$. Such fibres are disclosed for example in French Pat. No. 79,11031;

finally, the class of structures which do not present any skin as illustrated in FIG. 6, in which the porous structure between the inner periphery G and the outer periphery C comprises both macrovoids and microvoids respectively D and B. This type of fibres is disclosed for example in French Pat. No. 73,15427.

On the other hand, this invention aims at hollow fibres of asymmetric structure differing from the various above-mentioned structures in that they present a relatively dense layer ("skin") of very low thickness (lower than 1 $\mu$m and preferably lower than 0.1 $\mu$m) at their outer periphery which is bonded to a structure having an increasing porosity in the direction of its inner face.

In a particular manner:

the structure underlying said skin is a socalled "open" structure advantageously composed of a microporous layer directly in contact with said dense skin and is characterized by the presence of pores of dimensions higher than 0.1 $\mu$m and lower than 2 $\mu$m and of a macroporous layer presenting macrovoids therein substantially cylindrical radially oriented and regularly spaced with walls of homogeneous porosity in the radial direction opening on the side of the inner face of the fibre and not opening on the side of the outer face, such macrovoids being of a main size higher than 2 $\mu$m, the porportion of such macrovoids representing at least 10% of the wall bulk.

According to other characteristics:

said outer skin presents a very low thickness lower than 0.1 $\mu$m and is permeable to water with a substantial absence of pores having a diameter higher than 1000 Å;

the proportion of macrovoids represents at least 20% of the wall bulk;

the macrovoids substantially cylindrical are of a length that may reach more than 9/10th of the thickness of the total wall;

the diameter of the circular cross-section of the macrovoids is generally higher than 5 $\mu$m;

the hollow fibres according to the invention are based on any fibrogenic polymers dissolvable in a solvent and coagulated in a non-solvent.

Among the examples of polymers capable of forming the fibres according to the invention there can be cited the vinylidene polyfluorides, the polysulfones, the polyacrylonitriles, the cellulose, and cellulosic esters, the poly(vinyl chlorides), the poly(vinyl acetates), the polyamides, the polyimides, the polycarbonates, the poly(phenylene oxides), the polystyrenes and more generally the polyethers, the polyesters, the poly(arylene oxides), the polysulfides, the polyvinylic polymers, the polyallylic polymers, the polyazoles and the polyimidazoles, the polyphosphazines, the polyhydrazides or such fibrogenic polymer can be selected among the copolymers or the polymer mixtures constituted from at least one of the above polymers.

One may obtain the fibres dealt with by using any known methods and in particular the spinning method called "dry-wet method".

According to such method a solution of the polymer in its solvent is extruded in a spinning nozzle advantageously of the ring type with injection of a gas, vapor or a liquid through the extrudate hole, then passing the resulting hollow fibre into a coagulating bath.

To obtain by this method the hollow fibres of the invention such as defined above, there is provided for:

adding to the polymeric solution in its solvent at least one particular additive, injecting a particular fluid through the extrudate hole.

The particular additive is selected among molecules permitting to obtain a macroscopically homogeneous solution with the solvent polymer couple while being extractable from the fibre upon coagulation of the latter or through any appropriate later treatment. As a example of molecules of additive responding to the above-definition there can be cited either macromolecules of molecular mass higher than 500 of the type comprising polyvinylpyrrolidones, polyvinylpyridines, polyvinylic alcohols, polyethyleneglycols, polyacrylamides, polyacrylic acids, or surfactants whether ionic or not, comprising in their molecule both at least one hydrophobic unit and at least one hydrophilic unit (whether ionic or not), and the hydrophobic unit may then be of the polyoxyethylene type.

The particular fluid of internal injection can be a liquid or a gas and it contains a sufficient quantity of at least one solvent for the fibrogenic polymer to prevent said fluid coagulating the solution containing the fibrogenic polymer.

The scope and interest of the invention will appear more clearly from the following description which is made in reference to the attached drawings in which:

FIGS. 1 and 6 which have already been described illustrate different types of known fibres;

Figure 7:
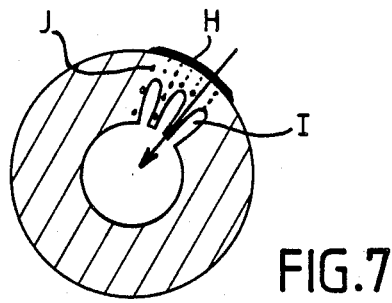
FIG. 7 is a schematic figure drawn on the same bases as for FIGS. 1 to 6, illustrating the cross-section of a fibre according to the invention.
Figure 8:
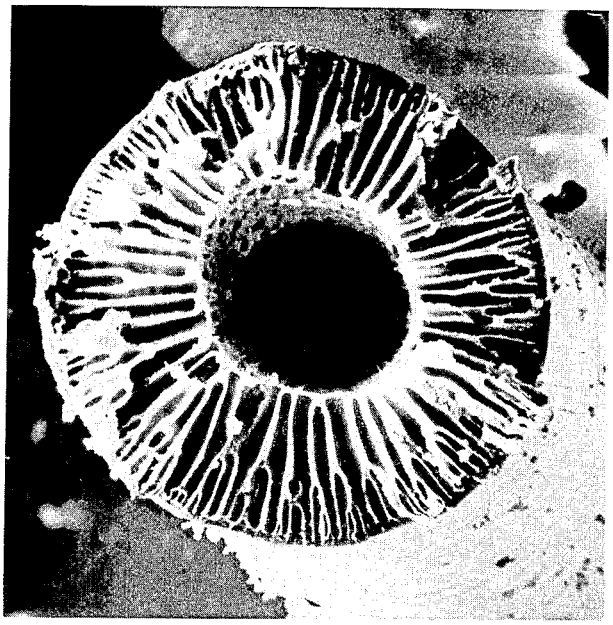
FIGS. 8, 9, 10 and 11 are different photographic views by means of an electronic microscope of a fibre according to the invention.
Figure 9:
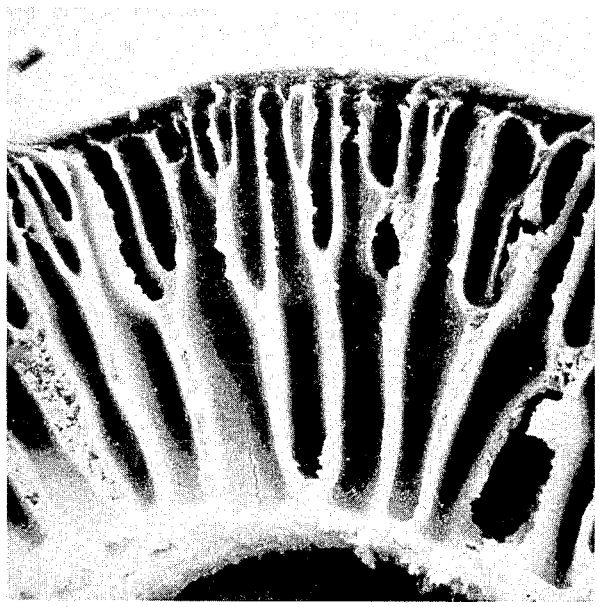
Figure 10:
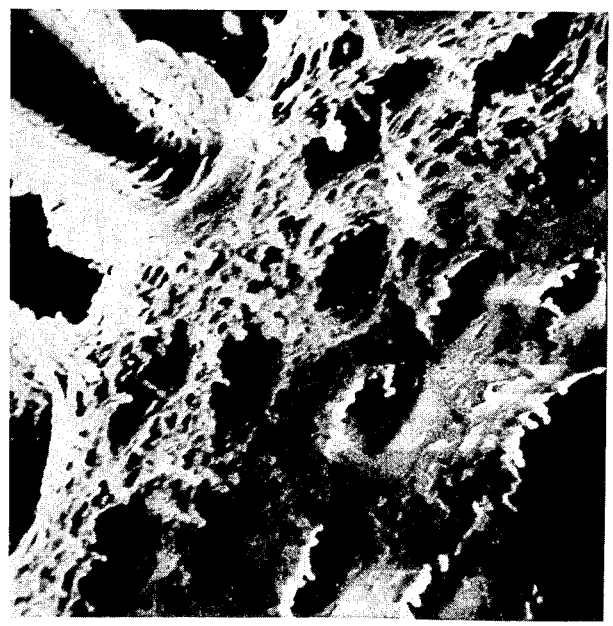
Figure 11:

With reference to these figures, it can be seen in particular from the photographic enlargements 8 and 9 (axial cross-sections) an outer skin designated by H on the diagram of FIG. 7; a porous structure comprising macrovoids I therein in form of elongated inwardly opening fingers as can be seen more precisely on the photographic enlargement 10. Such photographic enlargement actually corresponds to a view taken from the inside of the fibre. The substantially circular craters which can be distinguished therein correspond to the end of such fingers. On this enlargement there can also be observed microvoids J. As to the other skin H, it appears on the photographic enlargement 11, which shows the density of such skin without clearly visible voids. In view of this structure it is obvious that the fibre porosity increases from the outside to the inside.

For greater precision it is to be noted that in the photographic enlargement 8, 1 cm=50 $\mu$m; in the enlargement 9, 1.5 cm=25 $\mu$m; in the enlargement 10, 1 cm=5 $\mu$m; and in the enlargement 11, 1 cm=1 $\mu$m.

Figure 12:
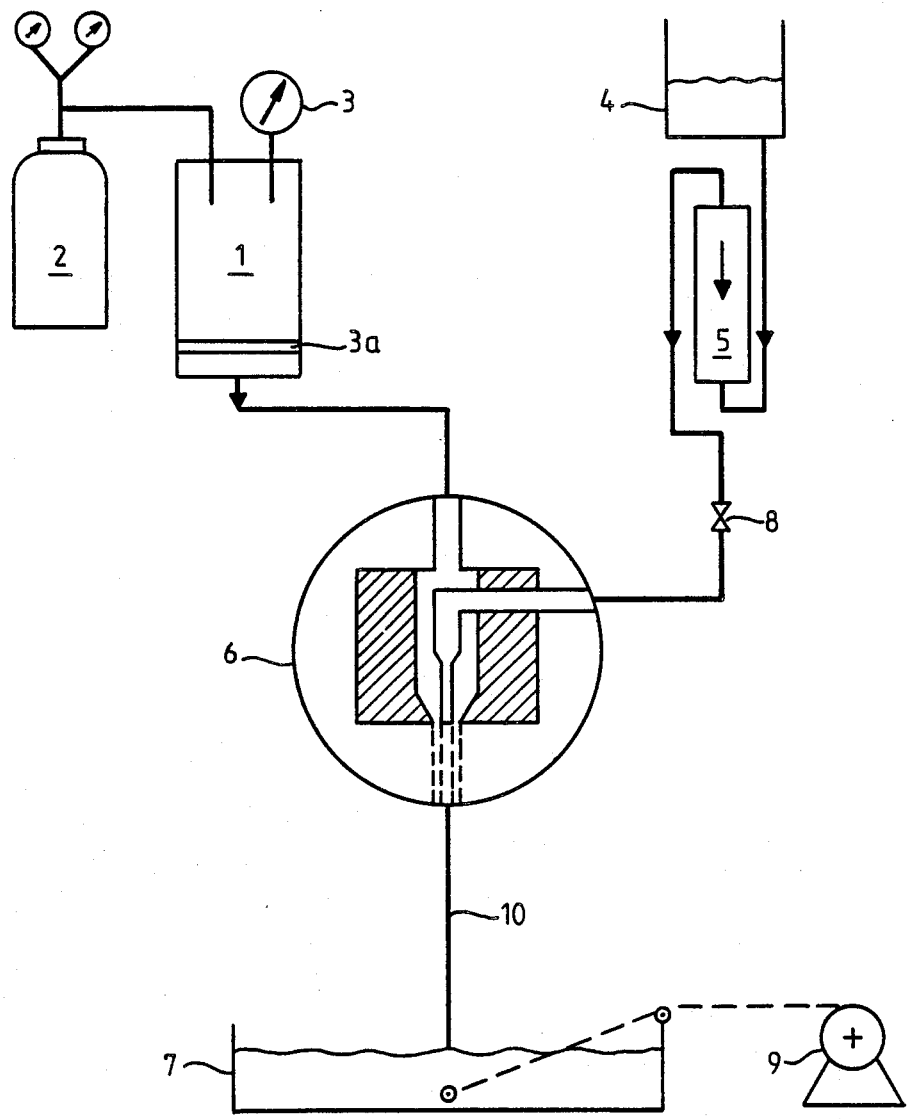
FIG. 12 is an explanatory diagram of the process used for realizing a fibre according to the invention.

To obtain the so illustrated hollow fibres the spinning method called "dry-wet method" is preferably used. Such method is schematically shown in FIG. 12.

A polymer solution container 1 advantageously provided with a filter 3a lets this solution flow into the spinning nozzle 6 shown on a larger scale under pressure by introducing an inert gas such as for example nitrogen supplied from the gas bottle 2, control of such pressure being made by a manometer 3.

The polymer solution flowing from the container 1 contains a solvent for such polymer and at least one additive such as defined above, i.e. either a macromolecule of molar mass higher than 500 or a surfactant whether ionic or not (hydrophilic, hydrophobic).

Concomitantly there is admitted into the annular orifice of such spinning nozzle 6 the fluid containing the solvent such as described above. Obviously the fluid flows from a container 4 and feeding thereof into the spinning nozzle is effected through a flowmeter 5 controlling the flow rate and a valve 8 which is controlled as a function of the desired flow rate. A motor 9 for winding up the fibre 10 lying downstream of the coagulation vat 7 containing the coagulating solution permits both to adjust the fibre stretch tension and storage thereof.

The coagulation solution can be selected among all appropriate non-solvents. This will preferably be water.

By preceeding in this manner asymmetry of the hollow fibre according to the invention is obtained due to differeing coagulation of both faces of the extrudate. The outer face of the fibre coagulates quickly by contacting the non-solvent of the polymer, whereas a very slow coagulation of the inner face occurs since the latter is in contact with the solvent contained in the fluid injected at the central portion of the annular orifice of the spinning nozzle 6.

Advantageously, this type of filling is realized by utilizing extrudable solutions capable of forming a solid precursor, having viscosities at about 5 ;l Pascal/second to 1000 Pascal/second or more, at the spinning temperature.

Moreover, the non-solvent and the solvent must be miscible and preferably in any proportions and the additive can advantageously be eliminated from the fibre through simple washing by means of a solvent therefor which of course must be a non-solvent for the polymer.

It is obvious that the stronger the non-solvent for the polymer, the more significant the asymmetry and the lower the total coagulation time before washing and storage.

In the following Examples characterization of the porosity is achieved by observing negatives obtained by electronic scanning microscopy. If this technique permits to ensure that the skin does not comprise pores of the size higher than about 1000 Å (0.1 $\mu$m), it does not permit to easily detect with certitude pores of a lower dimension. To check for the presence of smaller pores, permeability to water was used. A process for measuring permeability to water consists of forming a loop of a few hollow fibres. The open end of the hollow fibres is inserted into a tube sheet. This loop is then placed into a cylindric housing. Pressurized water is introduced into the housing and watr having passed through the fibre wall is collected from the open end of the loop.

The ratio of the water quantity collected (expressed in m$^3$ and m$^2$ of area) of the pressure differential applied on both sides of the fibre wall (expressed in Pascal) is used for putting a figure to permeability. Such ratio denoted by Lp is called "hydraulic permeability coefficient". Its units are m$^3$/m$^2$.s.Pa or m/s.Pa. All permeabilities are measured at the temperature of 25° C.

EXAMPLE 1

From a solution composed of 29% of polysulfone ("Udel 3500"), 22% of "Triton X 100" and 49% of N-N-dimethylformamide (mass %) a hollow fibre has been extruded with the described method and with N-N-dimethylformamide as internal injection fluid, and water as coagulant.

Its outer diameter is 580 μm and its inner diameter 440 μm.

The hollow fibre represents the structure according to the invention:

on its external face there is found a skin without any pores of a diameter higher than 1000 Å;

the open structure underlying the outer skin consists of a microporous layer of a thickness of 30 μm presenting pores the highest size of which is about 1.5 μm, and a macroporous layer presenting macrovoids of cylindric shape radially oriented opening onto the inner face, having a length of about 40 μm and a diameter on its internal face of about 14 μm. Such macrovoids occupy at least 20% of the wall bulk.

The presence of pores of a diameter lower than 1000 Å in the skin is brought to light by permeability to water:

$$L_{p25°C.} = 6,9.10^{-10} m^3/m^2.s.Pa$$

EXAMPLE 2

A hollow fibre was spun from a solution composed of 28% of vinylidene polyfluoride ("PCUK 1000"), 18% of "Triton X 100" and 54% of N-N-dimethylformamide (mass %), with N-N-dimethylacetamide as internal injection fluid and water as coagulant. Its outer diameter is 580 μm and its lower diameter 440 μm.

The hollow fibre presents the structure according to the invention:

on its outer face there is a skin without any pores of a diameter higher than 1000 Å;

the open structure underlying the outer skin consists of a microporous layer of a thickness of 4 μm presenting pores the highest size of which is about 0.5 μm, and a macroporous layer presenting macrovoids of cylindric shape radially oriented and opening onto the inner face, having about a length of 121 μm and a diameter of 15 μm on its inner face. The macrovoids occupy about 40% of the wall bulk.

The presence of pores of a diameter lower than 1000 Å in the outer skin is brought to light through permeability to water:

$$L_{p25°C.} = 2,6.10^{-10} m^e/m^2.s.Pa$$

EXAMPLE 3

A hollow fibre was spun from a solution composed of 18% of polysulfone ("Udel 3500"), 18% of polyvinylpyrrolidone "K15" and 64% of N-N-dimethylformamide (mass %), with N-N-dimethylformamide as internal injection fluid and water as coagulant. Its outer diameter is 430 μm and its inner diameter 150 μm.

The hollow fibre presents the structure according to the invention:

on its outer face, there is found a skin without any pores of a diameter higher than 1000 Å;

the open structure underlying the outer skin consists of a microporous layer of a thickness of 20 μm presenting pores the highest dimension of which is about 1 μm, and a macroporous layer presenting macrovoids of cylindric shape radially oriented and opening onto the inner face, having a length of about 120 μm and a diameter of 10 μm, on its inner face. The macrovoids occupy about 60% of the wall bulk.

The presence of pores of a diameter lower than 1000 Å in the outer skin is brought to light by permeability to water:

$$L_{p25°C.} = 0,4.10^{-10} m^3/m^2.s.Pa$$

EXAMPLE 4

Spinning without bringing additive

There is realized a solution with 29% of polysulfone ("Udel 3500") and 71% of N-N-dimethylformamide.

This solution is spun by the described process using N-N-dimethylformamide as internal injection fluid. It is noted upon examining the obtained fibre that it comprises an outer skin and an open underlying structure with the presence of macrovoids some of which open onto the inner face. However one characteristic of such fibre spun in the absence of additive is that its permeability to water is very low thereby showing that the skin has very little pores:

$$L_{p25°C.} < 10^{-12} m/s.Pa$$

EXAMPLE 5

Spinning in the presence of water in the internal injection fluid

There is prepared a solution identical to that of the Example 1. Such solution is spun by the described process using a solution of the following type as the internal injection fluid:

90% of N-N-dimethylformamide,
10% of water (mass %).

There is obtained a hollow fibre. Its outer diameter is 350 μm and its inner diameter is 110 μm.

The hollow fibre presents the structure according to the invention:

on its outer face there is found a skin without any pores of a diameter higher than 1000 Å;

the open structure underlying the outer skin consists of a microporous layer of a thickness of 7 μm presenting pores the highest size of which is about 1.5 μm and a macroporous layer presenting macrovoids of cylindric shape radially oriented, having a length of about 107 μm. The macrovoids occupy about 40% of the wall bulk.

One characteristic of these fibres spun out with the presence of 10% of water in the internal injection fluid is that the macrovoids which have a diameter of about 16 μm in the wall become narrower so that they have only a diameter of 2 ∥ m when they open onto the inner face.

The presence of pores of a diameter lower than 1000 Å in the outer skin is brought to light through permeability to water:

$$L_{p25°C.} = 0,46.10^{-10} m^3/m^2.s.Pa$$

The hollow fibres obtained according to the invention find interesting applications in various fields and in particular they can be directly used in ultrafiltration or microfiltration in the dialysis field, the reverse osmosis field, the gaseous permeation or pervaporation field or even as liquid membrane carrier.

Figure 13:
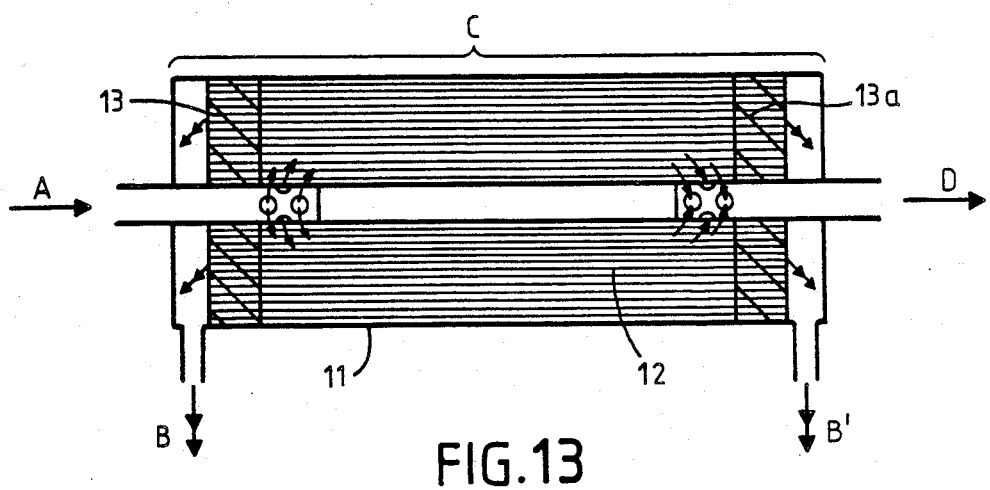
FIG. 13 illustrates a possible embodiment of a cartridge utilizing fibre bundles with longitudinal outer circulation (CEL)

The presence of an outer skin in the structure of the fibres according to the invention permits their use in ultrafiltration or microfiltration in systems in which the fluid to be processed will advantageously circulate outside the fibres thereby rendering such systems compact and performant as shown by the Examples given hereinbelow:

With reference to FIG. 13, the cartridge designated by reference C is composed of a cylinder 11 containing a bundle 12 of a large number of hollow fibres disposed in parallel to one another. The ends of each fibres are embedded into a block 13-13a of suitable resin and adhere to such block thereby ensuring tightness between the liquid to be "ultrafiltered" entering the orifice A under pressure to cause such liquid to circulate substantially in parallel to the fibre centerline and outwardly thereof (in the direction A-D). The permeate collected in the inner channel of each of the fibres flows out of the cartridge by either one of both of the fibre ends (arrow B-B').

Figure 14:
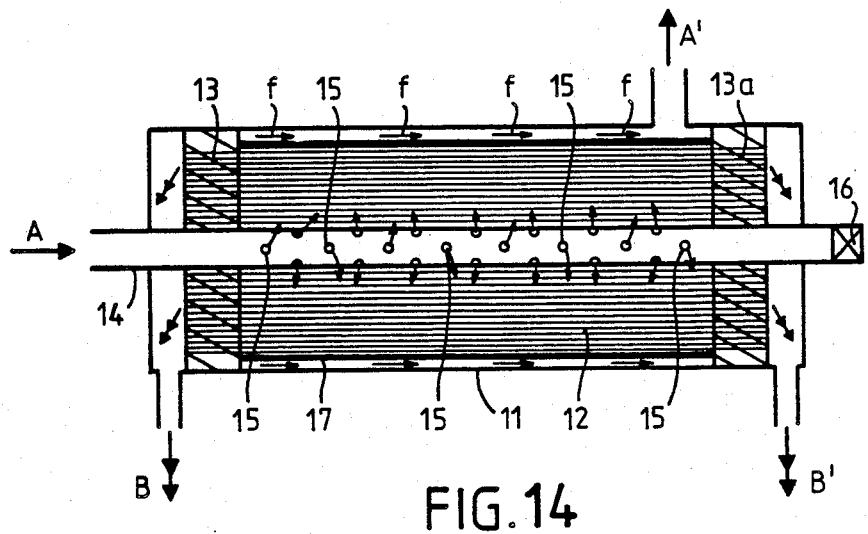
FIG. 14 illustrates another possible embodiment of a cartridge utilizing fibre bundles with radial outer circulation (CER)

The cartridge shown in FIG. 14 is also constituted by a cylinder 11, a bundle of hollow fibres 12 the end of which are as previously embedded and adhered into the resin blocks 13-13a. The liquid to be treated A is brought to the center of the fibre bundle by means of a tube 14 formed with multiple orifices 15 therein, such tube 14 being disposed in parallel to the fibre centerline. It is obturated at the end turned away from the inlet end of liquid A through a removable stopper 16. Circulation of liquid A occurs under pressure and due to the presence of stopper 16 such circulation is substantially effected perpendicularly to the fibre centerline, due to the presence of orifices 15. The permeate is collected in the inner channel of the fibres and it flows out of the cartridge through either one of both ends of the fibres (arrow B-B'). The solution flows out in A' following arrow f, with a grid of any suitable material 17 providing for the desired circulation space between the walls of the cylinder 11 and the fibre bundle 12.

Figure 15:
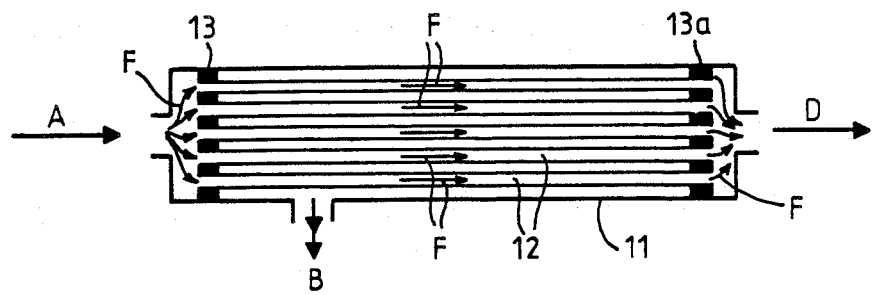
FIG. 15 illustrates a third possible embodiment utilizing fibre bundles with internal circulation (CI).

On the other end, with reference to FIG. 15, which illustrates an internal circulation cartridge, wherein as in the preceding case the fibre bundle 12 is disposed within the cylinder 11 with the end of the fibres embedded into the blocks 13-13a, the liquid A to be treated circulates under pressure in the direction A-D within internal channels of the fibres as illustrated by arrows F. The permeate is collected outside the bundle of fibres and circulates outside the cartridge through one or more orifices such as at B formed on the periphery of the cylinder 11.

The following Examples are intended to compare the performances obtained with a cartridge containing inner skin hollow fibres (where circulation of the medium to be treated occurs inside the hollow fibres with a cartridge realized as illustrated in FIG. 15) of the same bulk as the cartridges realized according to FIGS. 13 and 14.

The fibres which equip the cartridges (CEL and CER) such as illustrated in FIGS. 13 and 14 were obtained by the above described process.

It results from the spinning of a solution composed of 29% of polysulfone ("Udel 500"), 22% of "Tryton X 100" and 49% of N-N-dimethylformamide (such percentage being mass %), the internal injection fluid being N-N-dimethylformamide, and water having being used for coagulation of the outer face of the hollow fibre.

These fibres are characterized, as regards their structure, by presenting on their outer face a skin wihtout any pores of a diameter higher than 1000 Å and the open structure underlying the outer skin consisting of a microporous layer presenting pores therein the highest size of which does not exceed 1.5 $\mu$m and a macroporous layer presenting macrovoids of cylinder shape radially oriented and opening onto the inner face; these macrovoids are of a diameter of about 15 $\mu$m.

The fibres fitting the cartridge CI (FIG. 15) are obtained according to the process described in the publication "Hollow fibres of polysulfone. Preparation and properties of transfer to ultrafiltration" from the Compte Rendu de l'Académie des Sciences Paris, v. 293, series II pp. 681-686 (Nov. 9, 1981). They result from the spinning of a solution composed of 18% of polysulfone ("Udel 3300"), 18% of polyvinylpyrrolidone "K15" (Fluka) and 64% of N,N-dimethylacetamide. Water is used as internal coagulation fluid. They are characterized in that they present on their inner phase a skin without any pores of a diameter higher than 1000 Å and a microporous layer comprising macrovoids which do not open onto the outer face.

The characteristics of the cartridges cited in the Examples hereinbelow are summarized in Table 1.

EXAMPLE 6

An aqueous 5 g/l NaCl solution is ultrafiltered by means of the cartridge CEL (FIG. 13) at 25° C. The circulation flow rate at the inlet to the cartridge is $4.6.10^{-5}$ m$^3$/s. The pressure at the inlet is 115 kPa and 100 Kpa at the outlet from the cartridge i.e. a charge loss of 15 kPA.

The electric conductivities of the treated solution and the permeate are measured and it is noted that they are identical thereby proving that the fibres let the saline solution pass freely therethrough.

Then by means of the cartridge CEL (FIG. 13) a 10 g/l solution of "Dextran T70" of an average molar mass $\overline{M}w=40,000$ is ultrafiltered. The concentration of the treated solution is maintained constant by recycling the ultrafiltrate. By analyzing in differential refractometry the ultrafiltrate and the treated solution it is observed that the ultrafiltrate does not contain any "Dextran T70" thereby proving that the fibres totally retain such macromolecule.

The circulation flow rate (outside the fibres) at the inlet to the cartridge is $4.6.10^{-5}$ m$^3$/s. The inlet pressure is 118 kPa, the outlet pressure 100 kPa i.e. a charge loss of 18 kPA.

The ultrafiltrate flow rate is $2.3.10^{-6}$ m$^3$/s.

Comparison with cartridge CI (FIG. 15) of the same volume

When the same solution as before is used for ultrafiltration the cartridge CI containing hollow fibres with an inner skin totally retaining "Dextran T70" with a circulation flow rate of $4.6.10^{-6}$ m$^3$/s, the inlet pressure is 126 kPa, the outlet pressure 100 kPA i.e a charge loss of 26 kPa.

The ultrafiltrate flow rate is $0.51.10^{-6}$ m$^3$.

The required power to circulate the fluid in the cartridge is equal to the product of the circulation flow rate times the charge loss, i.e.:

0.83 watt for cartridge CEL, 1.2 watt for cartridge CI.

The energy consumed per ultrafiltrate volume unit is equal to the power required for the circulation as divided by the ultrafiltrate flow rate, i.e.:

0.10 kWh/m$^3$ (3.6.10 joules/m$^3$) for cartridge CEL,
0.65 kWh/m$^3$ (23.5.10 joules/m$^3$) for cartridge CI.

There is noted a higher ultrafiltrate flow rate and a lower energy consumption per ultrafiltrate volume unit for cartridge CEL than for cartridge CI.

EXAMPLE 7

Figure 1:
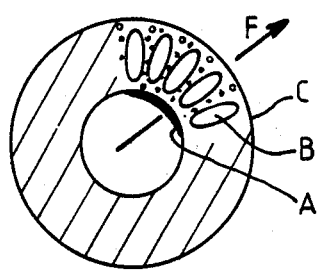
Figure 2:
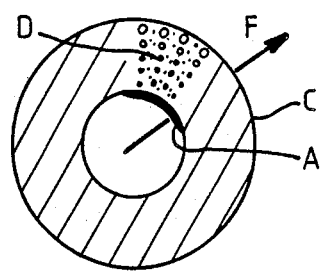
Figure 3:
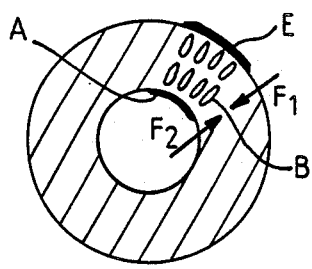
Figure 4:
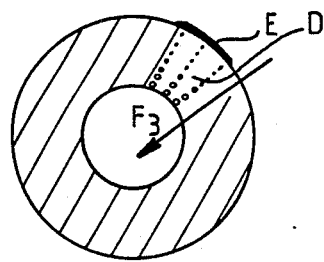
Figure 5:
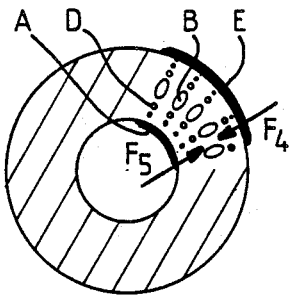
Figure 6:
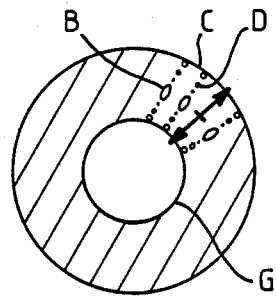

As in Example 6, it is verified that fibres of cartridge CER (FIG. 2) which are used here let an aqueous 5 g/l NaCl solution pass freely therethrough.

There is ultrafiltered by means of cartridge CER at 25° C., a 10 g/l solution of polyvinylpyrrolidone (PVP) K90 of average molar mass $\overline{M}w = 360,000$. As in Example 1, concentration of the treated solution is maintained constant and it is verified that the fibres totally retain PVP K90. The circulation flow rate (outside the fibres) at the inlet to the cartridge is $4.6.10^{-5}$ m$^3$. The inlet pressure is 123 kPa, the outlet pressure 100 kPa, i.e. a charge loss of 23 kPA.

The ultrafiltrate flow rate is $0.86.10^{-6}$ m$^3$.

Comparison with the cartridge CI of the same volume

The same solution as before is used for ultrafiltration, cartridge CI containing inner skin fibres which totally retain polyvinylpyrrolidone "K90". The circulation flow rate (within the fibres) at the inlet to the cartridge is $4.6.10^{-5}$ m$^3$/s. The inlet pressure is 175 kPa, the outlet pressure is 100 kPa, i.e. a charge loss of 75 kPa.

The ultrafiltrate flow rate is $0.66.10^{-6}$ m$^3$/s.

The power required for circulation of the treated solution in the cartridge and the energy consumed by ultrafiltrate volume unit are calculated as in Example 1.

Power 1.1 watt for cartridge CER,
3.4 watts for cartridge CI.

Energy 0.36 kWh/m$^3$ (1.28.10$^6$ joules/m$^3$) for cartridge CER,
1.43 kWh/m$^3$ (5.15.10$^6$ joules/m$^3$) for cartridge CI.

There is noted a higher ultrafiltrate flow rate and a lower energy consumption per ultrafiltrate volume unit for cartridge CER than for cartridge CI.

EXAMPLE 8

A 6 g/l solution of proteins of lactoserum is ultrafiltered by means of a cartridge CER (FIG. 2) at the temperature of 25° C.

Analysis of the ultrafiltrate shows that the proteins are totally retained by the fibres.

This solution of 6 g/l is concentrated to 30 g/l thereby passing from an initial volume of 1 liter to a final volume of 0.2 liter. The circulation flow rate (outside the fibres) at the inlet to the cartridge is $3.10^{-5}$ m$^3$/s. The inlet pressure is 108 kPa and the outlet pressure 100 kPa, i.e. a charge loss of 8 kPa.

The ultrafiltrate flow rate changes from $0.06.10^{-6}$ m$^3$/s at the beginning to $0.33.10^{-6}$ m$^3$/s at the end of the concentration. This gives an average ultrafiltrate flow rate of $0.53.10^{-6}$ m$^3$/s. The power required for circulation and energy consummed per ultrafiltrate volume unit are calculated as in Example 1.

Power 0.24 watt

Energy 0.13 kWh/m$^3$ (0.45.10$^6$ joules/m$^3$).

After washing the cartridge according to the method of Table 2 the initial hydraulic permeability of the cartridge is again found.

EXAMPLE 9

A screamed milk (UHT "Candia") is ultrafiltered by means of cartridge CER 1 at the temperature of 50° C.

Analysis of the ultrafiltrate shows that the proteins are totally retained by the fibre.

This milk is concentrated by a factor 3 thereby passing from an initial volume of 0.9 liter to a final volume of 0.3 liter. The circulation flow rate (outside the fibres) at the inlet to the cartridge is $2.10^{-5}$ m$^3$/s. The inlet pressure is 110 kPa and the outlet pressure 100 kPa, i.e. a charge loss of 10 kPa.

The ultrafiltrate flow rate varies from $1.5.10^{-6}$ m$^3$/s at the beginning of the concentration to $0.12.10^{-6}$ m$^3$/s at the end of the concentration i.e. an average ultrafiltrate flow rate of $0.31.10^{-6}$ m$^3$/s.

The power required for circulation and the consumed energy per ultrafiltrate volume unit are calculated as in Example 6.

Power 0.2 watt

Energy 0.18 kWh/m$^3$ (0.64.10$^6$ joules/m$^3$).

After washing the cartridge according to the method of Table 2 the initial hydraulic permeability of the cartridge is found again.

TABLE 1

| | Characteristics of cartridges cited in the Examples. | | | | | | | | |
| --- | --- | --- | --- | --- | --- | --- | --- | --- | --- |
| Cartridge type | Cartridge total volume (m$^3$) | Cartridge outer diameter (m) | Cartr. total length (m) | Filling rate (1) | Fibre useful length (m) (2) | Fibre outer diameter (m) | Fibre inner diameter (m) | Fibre number | Membrane area (m$^2$) (3) | Fibre water permeability at 25° C. (m$^3$/m$^2 \cdot$ s $\cdot$ Pa) |
| CEL | 10$^{-4}$ | 2.5 $\cdot$ 10$^{-2}$ | 0.2 | 0.5 | 0.155 | 0.4 $\cdot$ 10$^{-3}$ | 0.2 $\cdot$ 10$^{-3}$ | 1378 | 0.268 | 2.10$^{-10}$ |
| CER | 10$^{-4}$ | 2.5 $\cdot$ 10$^{-2}$ | 0.2 | 0.6 | 0.155 | 0.36 $\cdot$ 10$^{-3}$ | 0.22 $\cdot$ 10$^{-3}$ | 1338 | 0.235 | 3.3 $\cdot$ 10$^{-10}$ |
| CER | 10$^{-4}$ | 2.5 $\cdot$ 10$^{-2}$ | 0.2 | 0.55 | 0.155 | 0.4 $\cdot$ 10$^{-3}$ | 0.17 $\cdot$ 10$^{-3}$ | 866 | 0.169 | 1.9 $\cdot$ 10$^{-10}$ |
| CI | 10$^{-4}$ | 2.5 $\cdot$ 10$^{-2}$ | 0.2 | 0.55 | 0.155 | 1.22 $\cdot$ 10$^{-3}$ | 0.57 $\cdot$ 10$^{-3}$ | 163 | 0.045 | 6.75 $\cdot$ 10$^{-10}$ |

(1) The filling rate is the cartridge internal volume fraction occupied by the fibres.
(2) The useful length is equal to the total length, reduced by the stuck lengths at the fibre bundle ends.
(3) The membrane area is calculated from the fibre outer diameter for cartridges CER and CEL and from the inner diameter for cartridge CI.

TABLE 2

| | Washing step sequence after milk product ultrafilitration. | | |
|---|---|---|---|
| Step N° | washing solution nature | Temperature | Washing duration |
| 1 | Water | A (1) | 15 min |
| 2 | 0.3%-nitric acid | 50° C. | 15 min |
| 3 | Water | A (1) | 15 min |
| 4 | 0.5%-soda + EDTA N 0.5% | 50° C. | 15 min |
| 5 | Water | A (1) | 15 min |

(A) = ambient temperature.

It will be understood that this invention was only described in a purely explanatory and not at all limitative manner and that any useful modufication thereof can be entered without departing from its scope.

We claim:

1. Hollow fibers based on polymeric fibrogenic substances selected from the group consisting of vinylidene polyfluorides, polysulfones, polyacrylonitriles, cellulose and cellulosic esters, poly(vinyl chlorides), poly(vinyl acetates), polyamides, polyimides, polycarbonates, poly(phenylene oxides), polystyrenes, polyethers, polyesters, poly(arylene oxides), polysulfides, polyvinylic polymers, polyallylic polymers, polyazoles, polyimidazoles, polyphosphazines, polyhydrazides and copolymers or mixtures thereof of a structure which is asymmetrical in that they present a relatively dense outer layer having a thickness smaller than 0.1 μm on their outer periphery, which is bonded to an open structure, the porosity of which increases in the direction of the inner face, said open structure underlying said outer layer being composed of a microporous layer directly in contact with said outer layer, the hollow fibers being characterized by the presence of pores of dimensions higher than 0.1 μm and lower than 2 μm, and a macroporous layer presenting macrovoids therein substantially cylindrical, radially oriented and regularly spaced, with homogeneous porosity walls in the radial direction opening on the side of the inner face of the fiber and not opening on the side of the outer face, such macrovoids having a main dimension higher than 2 μm, the proportion of such macrovoids representing at least 10% of the wall bulk.

2. Hollow fibers according to claim 1, wherein the outer layer and is permeable to water with a complete absence of pores of a diameter greater than 1000 Å.

3. Hollow fibers according to claim 1 wherein the proportion of the macrovoids represents at least 20% of the wall bulk of the fibers.

4. Hollow fibers according to claim 1 wherein the substantially cylindrical macrovoids are of such a length that the macrovoids may comprise more than 9/10 of the thickness of the total wall of the fiber.

5. Hollow fibers according to claim 1 wherein the diameter of a circular cross-section of the macrovoids is at least 5 micrometers.

6. Hollow fibers according to claim 1 wherein the fibers are based on a fibrogenic polymer which is dissolved in a solvent and coagulated in a non-solvent.

7. Hollow fibers according to claim 2 wherein the proportion of the macrovoids represent at least 20% of the wall bulk; the substantially cylindric macrovoids are of a length that may reach more than 9/10 of the thickness of the total wall of the fiber; and the diameter of the circular cross-section of the macrovoids is at least 5 micrometers.

8. Hollow fibers according to claim 7 wherein the fibers are based on polymers dissolved in a solvent and coagulated in a non-solvent.

* * * * *